Patented Nov. 28, 1922.

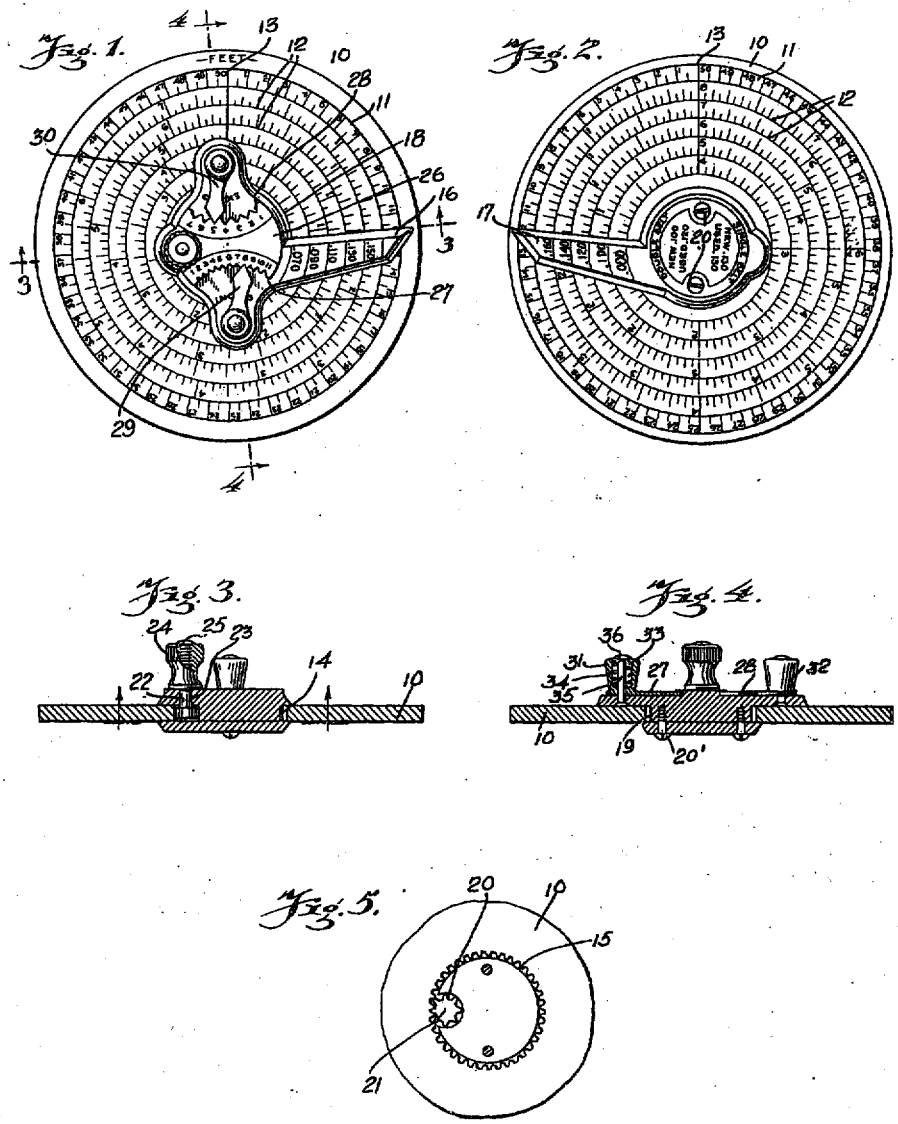

1,437,298

UNITED STATES PATENT OFFICE.

GUSTAV R. PICKERT, OF HOBOKEN, NEW JERSEY.

BELT CALCULATOR.

Application filed August 11, 1921. Serial No. 491,479.

*To all whom it may concern:*

Be it known that I, GUSTAV R. PICKERT, a citizen of the United States, and a resident of Hoboken, in the county of Hudson and State of New Jersey, have invented a new and Improved Belt Calculator, of which the following is a full, clear, and exact description.

This invention relates to a belt calculator. The general object of the invention is to provide a simple device for calculating the proper length of belting when the measurement over the pulleys is known and means for recording the true measure.

This object is accomplished by providing a circular scale representing feet, and in conjunction with this circular scale a plurality of circular scales representing inches of belting to be cut away for the different factors to allow for stretch and providing in conjunction with the scales index blades on which the various factors are marked to indicate the scale to be used.

This and other objects of the invention will be more clearly understood from the following detailed description and accompanying drawings.

Figure 1 is a top plan view of the calculator.

Figure 2 is a bottom plan view of the calculator.

Figure 3 is a cross-section along the line 3—3 of Figure 1.

Figure 4 is a cross-section along the line 4—4 of Figure 1.

Figure 5 is a plan view of the gearing for operating the index blades.

Referring to the above-mentioned figures, a disk 10 has a plurality of concentric circular scales marked on each side. The outside scale 11 represents feet and consists of a circle of a predetermined diameter divided into fifty equal parts. The remaining scales 12 are graduated in inches and the smaller divisions represent sixteenths of an inch. All the scales are numbered from a common base line 13. This disk 10 may be made of any suitable material, such as fibre, or well-cured wood. It has an opening 14 extending through it. Teeth 15 are cut in the disk around the opening 14.

A pair of index blades 16 and 17 are provided in conjunction with the disk 10. The index blade 16 has an enlarged base portion 18 integral with which is a drum-shaped portion 19. The diameter of the drum-shaped portion 19 is equal to the diameter of the disk opening 14 taken across from the top of one tooth to the top of the one diametrically opposite. A circular opening 20 is cut in the drum-shaped portion 19. A gear 21 is located in the opening 20 in the drum-shaped portion. This gear meshes with the teeth 15 around the opening in the disk 10. Fixed to the gear 21 is a shaft 22, which has its upper portion threaded. This shaft 22 extends through an opening 23 in the enlarged base portion 18 of the index blade 16. The index blade 16 is mounted on the disk 10 with the drum-shaped portion 19 fitting into the opening 14. The blade 17 is placed parallel to the index blade 16 and is connected to the drum 19 by means of screws 20'. Mounted on the threaded portion of the shaft 22 is a thumb nut 24, which is free to make a partial rotation without turning the shaft and is retained on the shaft by means of a small knob 25. When this thumb nut 24 is rotated to the left, it engages the knob 25 and then turns the shaft 22 rotating the gear 21 and serves to rotate the index blades 16 and 17. These index blades are so mounted that they rotate about the center of the concentric scales 11 and 12.

The index blades have marked thereon factors by which the true length measured over the pulleys should be multiplied to give the amount which should be subtracted from the true length to give the proper length of belting in order to allow for stretch. These factors are so located on the index blades that they register with the circular scales which indicate the amount to be subtracted from the true length to give the correct length of belting. Marked on the index blade 17 are the proper factors to use for single and double belting. Integral with the enlarged base portion 18 is a projection 26, which has two arc-shaped faces 27 and 28. These arc-shaped faces 27 and 28 are notched and the notches numbered, on the one side up to eleven and on the other side up to seven. The one numbered to eleven is to represent inches and the other numbered to seven is to represent eighths of an inch, these words being stamped on the enlarged base portion as a guide to the user. To operate with these notched arc-shaped faces 27 and 28 are two pointers 29 and 30 to register any true measurement that has been made.

Integral with the pointers 29 and 30 are handle portions 31 and 32 which extend at right angles. These handle portions are provided with cylindrical openings 33 extending downward from the top. Located in the cylindrical openings 33 are springs 34. These springs are held in contact with the handle portions 31 and 32 by means of bolts 35, which are fastened to the enlarged base portion 18 of the blade 16. The heads 36 of these bolts are of such a size that they slide in the cylindrical opening in the handle portions 31 and 32.

The operation of this device is as follows: The true measurement over the pulleys or other apparatus is obtained. The index blades are set so as to indicate a true length on the scale representing feet. The pointer 29 is set to indicate the number of inches and the pointer 30 the number of eighths of an inch. The factor for the particular type of belting is then selected and the scale corresponding with the factor is raised. This gives the number of inches to deduct from the true length in order to give the correct length of belting to use to allow for stretch.

For clearness, the example shown in Figure 1 will be described. In this case the true length measured over the pulleys was eleven feet, eight and five-eighths inches. The index blade 16 was set to indicate that length on the scale representing feet. The factor is then selected and let it be .150, then reading on the scale which corresponds with this factor we discover that the amount to be deducted from the true length is one and twelve-sixteenths inches.

I wish to state in conclusion that while the illustrated examples constitute a practical embodiment of my invention, I do not limit myself strictly to the mechanical details herein illustrated since manifestly the same can be considerably varied without departing from the spirit of the invention as defined in the appended claims.

Claims:

1. A belt calculating mechanism of the class described, comprising a disk having a plurality of scales marked thereon, an index blade having factors marked thereon rotatably mounted on the disk, gear means associated with the disk and index blade for rotating one with respect to the other, and means provided in conjunction with the gear means to lock the same against rotation to retain the index blade in any desired position.

2. As a new article of manufacture, a belt calculating mechanism, comprising an annular plate having a plurality of scales marked thereon, an index blade having factors marked thereon rotatably mounted on said annular plate, gear teeth formed on the inner edge of said annular plate, a gear and shaft rotatably mounted on said index plate, said gear meshing with the gear teeth of the annular plate, means associated with said shaft for operating it to operate the index blade, and means for locking the shaft against rotation to retain the index blade in any desired position.

3. As a new article of manufacture, a belt calculating mechanism, comprising an annular plate having a plurality of scales marked thereon, an index blade having factors marked thereon rotatably mounted on said annular plate, gear teeth formed on the inner edge of said annular plate, a gear and shaft rotatably mounted on said index blade, said gear meshing with the gear teeth of the annular plate, means associated with said shaft for operating it to operate the index blade, means for locking the shaft against rotation to retain the index blade in any desired position, and registering means mounted on the index blade.

4. As a new article of manufacture, a belt calculator of the class described, comprising an annular plate having a plurality of scales marked thereon, gear teeth formed on the inner edge of said annular plate, index blades rotatably mounted on said annular plate, one on each side of the same, a shaft rotatably mounted on one of said index blades, a gear fixed to said shaft and meshing with the gear teeth of said annular plate, a nut making threaded engagement with said shaft for rotating it when turned in one direction and locking it against rotation when turned in the other direction, means for retaining said nut on the shaft, and registering means mounted on one of the index blades.

5. As a new article of manufacture, a belt calculator of the class described, comprising an annular plate having a plurality of scales marked thereon, gear teeth formed on the inner edge of said annular plate, a drum having a plurality of index blades attached thereto rotatably mounted in said annular plate and having a chamber provided therein to house a gear, a shaft rotatably mounted in one of said index blades, a gear fixed to said shaft and located in the chamber formed in the drum, said gear meshing with the teeth of the annular plate, a nut making threaded engagement with the upper end of the shaft, means provided in conjunction with the shaft for retaining the nut on the shaft, said nut serving to rotate the shaft when turned in one direction and to lock it against rotation when turned in the opposite direction, registering pointers mounted on the drum, and means for retaining them in any position to which they have been set.

GUSTAV R. FICKERT.